US012621189B2

(12) United States Patent
Arvinte et al.

(10) Patent No.: US 12,621,189 B2
(45) Date of Patent: May 5, 2026

(54) CHANNEL ESTIMATION USING A SCORE-BASED GENERATIVE NETWORK

(71) Applicant: BOARD OF REGENTS, THE UNIVERSITY OF TEXAS SYSTEM, Austin, TX (US)

(72) Inventors: Marius Arvinte, Austin, TX (US); Jonathan I. Tamir, Austin, TX (US)

(73) Assignee: BOARD OF REGENTS, THE UNIVERSITY OF TEXAS SYSTEM, Austin, TX (US)

( * ) Notice: Subject to any disclaimer, the term of this patent is extended or adjusted under 35 U.S.C. 154(b) by 342 days.

(21) Appl. No.: 18/363,016

(22) Filed: Aug. 1, 2023

(65) Prior Publication Data

US 2024/0048411 A1 Feb. 8, 2024

Related U.S. Application Data

(60) Provisional application No. 63/394,772, filed on Aug. 3, 2022.

(51) Int. Cl.
*H04L 25/02* (2006.01)
(52) U.S. Cl.
CPC ...... *H04L 25/0224* (2013.01); *H04L 25/0254* (2013.01)
(58) Field of Classification Search
CPC .................... H04L 25/0224; H04L 25/0254
See application file for complete search history.

(56) References Cited

U.S. PATENT DOCUMENTS

| | | | |
|---|---|---|---|
| 9,197,736 B2 | 11/2015 | Davis et al. | |
| 9,462,107 B2 | 10/2016 | Rhoads et al. | |
| 11,348,005 B2 | 5/2022 | Navarrete Michelini et al. | |
| 11,575,544 B2 | 2/2023 | Andrews et al. | |
| 11,645,745 B2 | 5/2023 | Wei et al. | |
| 11,676,685 B2 | 6/2023 | Jaganathan et al. | |
| 2010/0278288 A1* | 11/2010 | Panicker ............... | H04L 5/0007 375/343 |
| 2016/0285571 A1* | 9/2016 | Badiu ................. | H04L 25/0224 |
| 2022/0092795 A1 | 3/2022 | Liu et al. | |
| 2023/0299862 A1* | 9/2023 | O'Shea .................. | G06N 20/00 370/252 |

OTHER PUBLICATIONS

Song, et al., "Improved Techniques for Training Score-Based Generative Models", 34th Conference on Neural Information Processing Systems (NeurIPS), 2020, 11 pages.
Jalal, et al., "Robust Compressed Sensing MRI with Deep Generative Priors", 35th Conference on Neural Information Processing Systems (NeurIPS), 2021, 17 pages.
Zilberstein, et al., "Annealed Langevin Dynamics for Massive MIMO Detection", IEEE Transactions on Wireless Communications (2022), 15 pages.

* cited by examiner

*Primary Examiner* — Natasha W Cosme
(74) *Attorney, Agent, or Firm* — Jackson Walker LLP; Christopher J. Rourk

(57) ABSTRACT

A system for processing data, comprising a scoring system operating on a processor and configured to receive a channel sample and a noise sample and to generate a channel estimate and a sampling system operating on the processor and configured to receive a pilot channel sample and the channel estimate and to iteratively modify the channel estimate until a predetermined error rate is achieved.

20 Claims, 8 Drawing Sheets

200

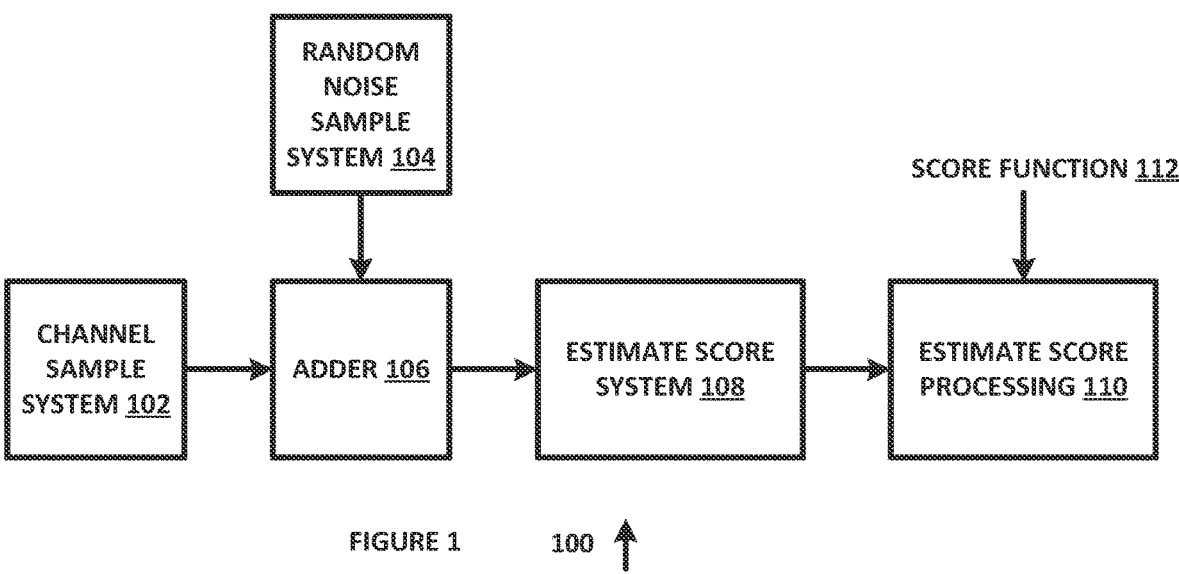
FIGURE 1    100 ↑
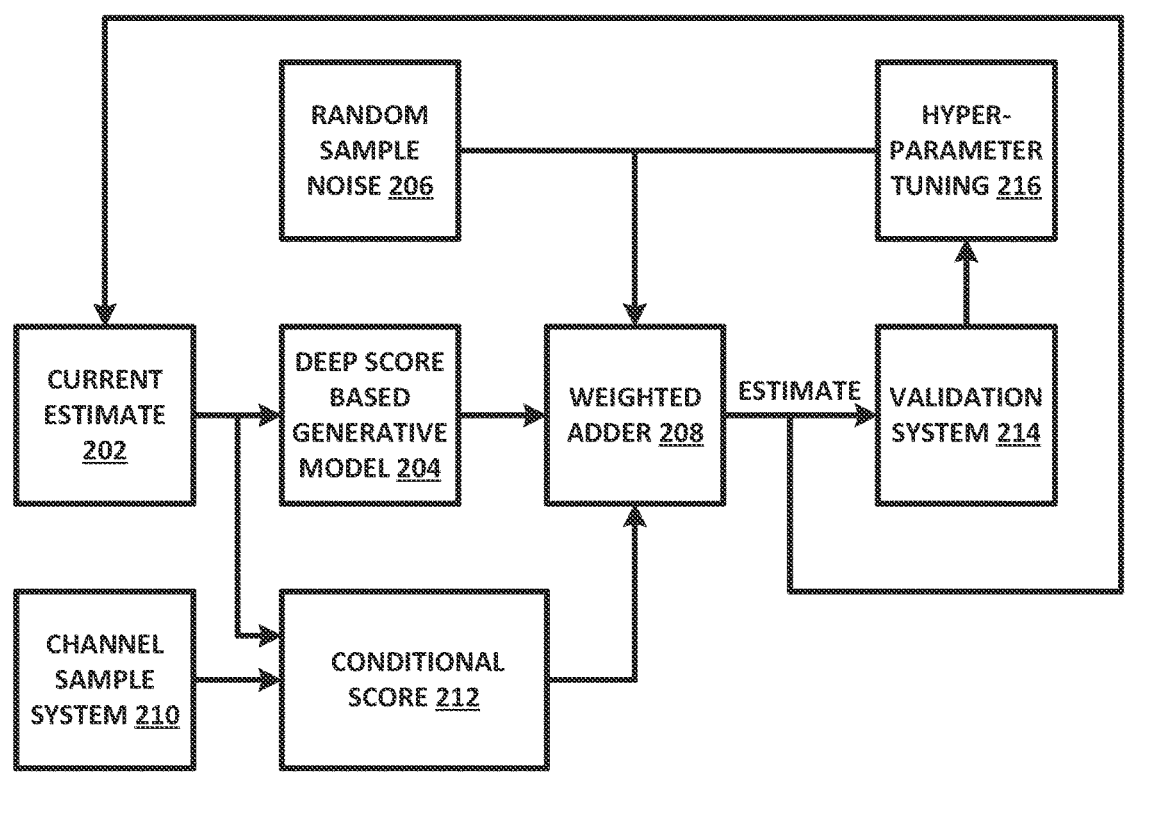
FIGURE 2    200 ↑

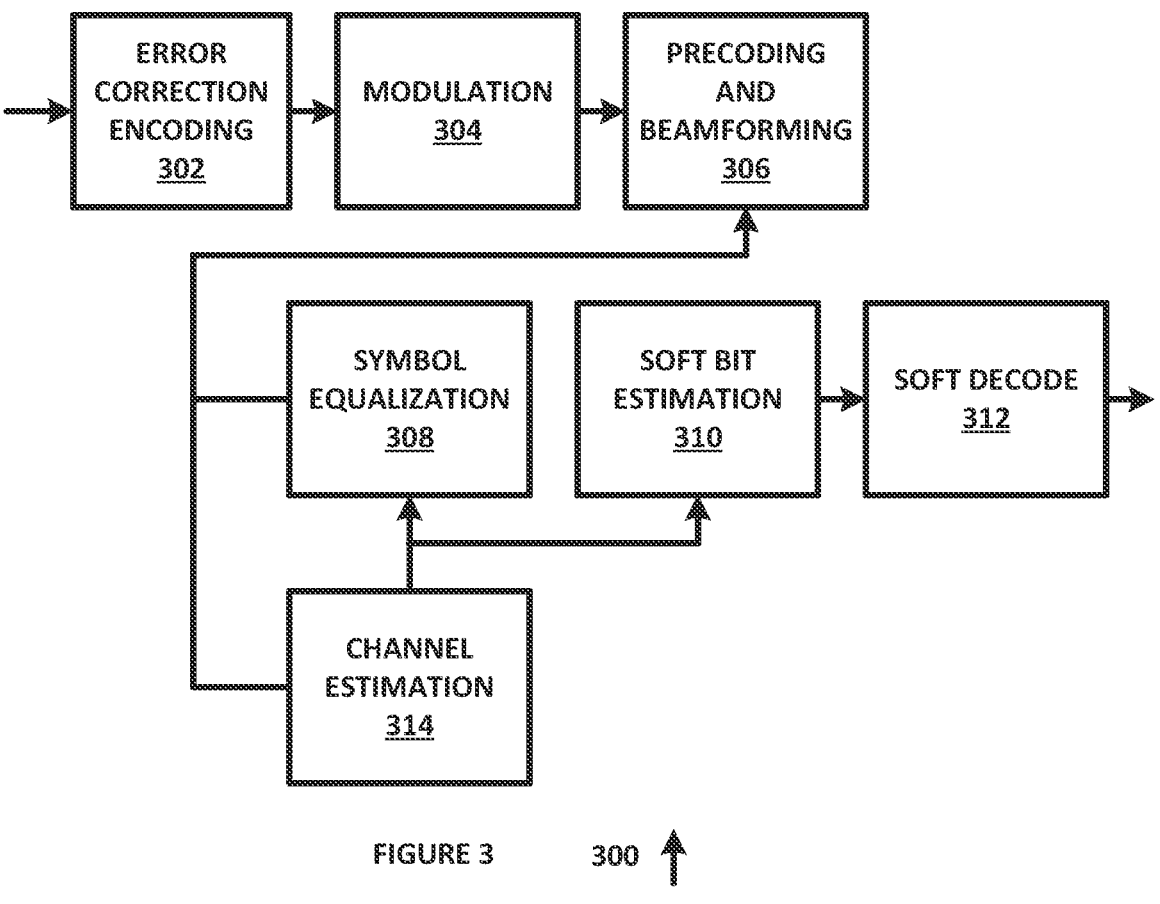
FIGURE 3 300 ↑
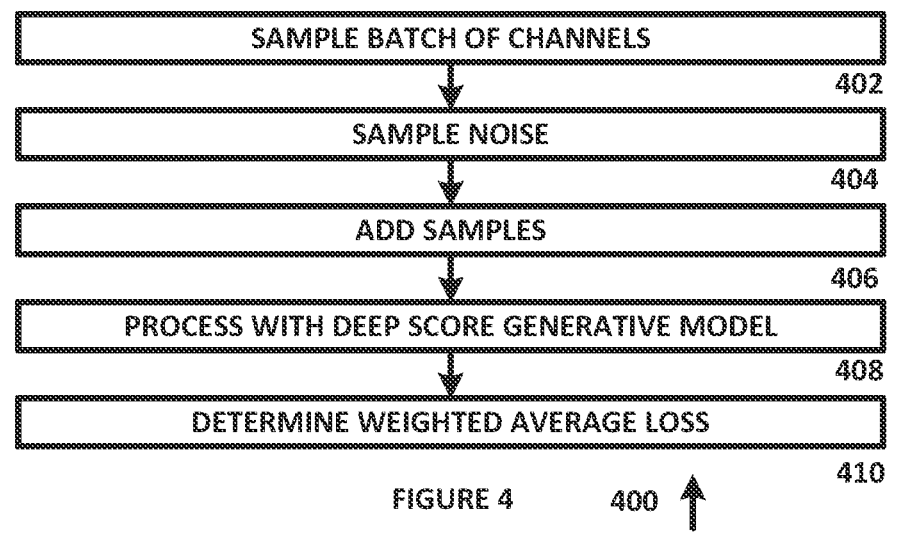
FIGURE 4 400 ↑

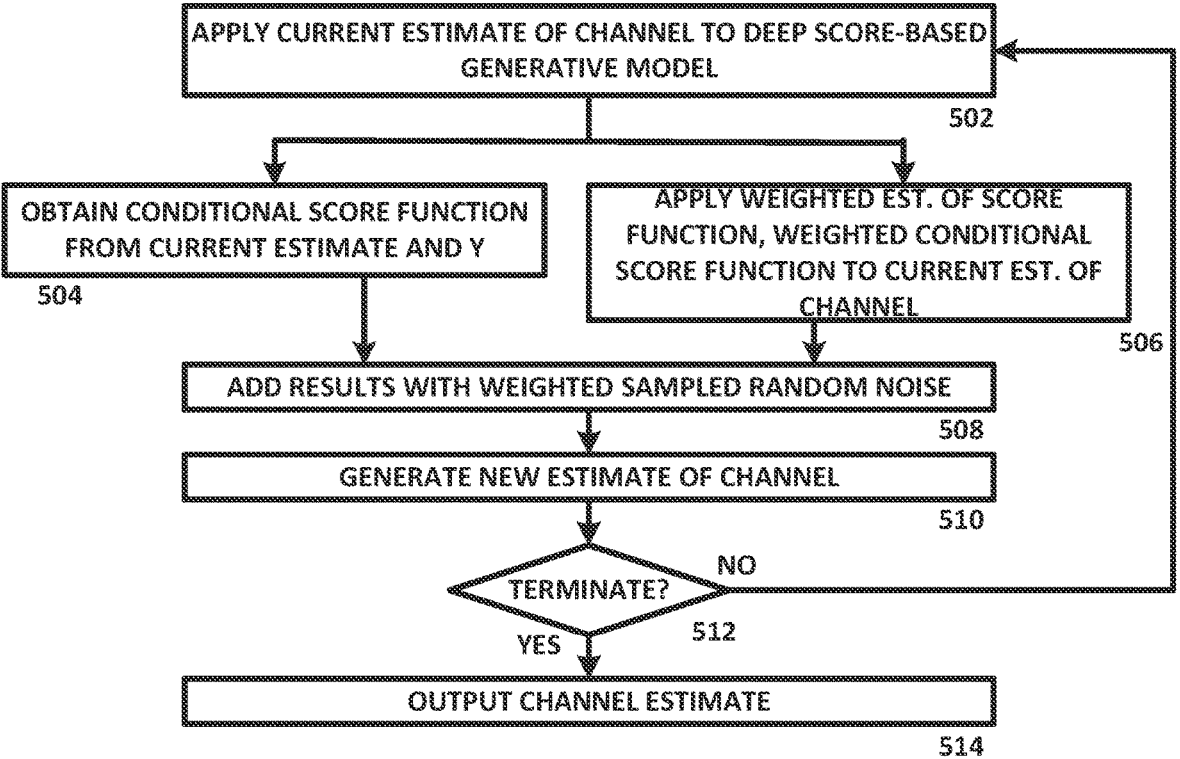

APPLY CURRENT ESTIMATE OF CHANNEL TO DEEP SCORE-BASED GENERATIVE MODEL

502

OBTAIN CONDITIONAL SCORE FUNCTION FROM CURRENT ESTIMATE AND Y

504

APPLY WEIGHTED EST. OF SCORE FUNCTION, WEIGHTED CONDITIONAL SCORE FUNCTION TO CURRENT EST. OF CHANNEL

506

ADD RESULTS WITH WEIGHTED SAMPLED RANDOM NOISE

508

GENERATE NEW ESTIMATE OF CHANNEL

510

TERMINATE?

512

NO

YES

OUTPUT CHANNEL ESTIMATE

CHANNEL ESTIMATION USING A SCORE-BASED GENERATIVE NETWORK

GOVERNMENT RIGHTS IN THE INVENTION

This invention was made with government support under Grant No. N00014-19-1-2590 awarded by the Office of Naval Research. The government has certain rights in the invention.

RELATED APPLICATIONS

The present application is a non-provisional application of U.S. Provisional Patent Application No. 63/394,772 filed Aug. 3, 2022, which is hereby incorporated by reference for all purposes as if set forth herein in its entirety.

TECHNICAL FIELD

The present disclosure relates generally to wireless data processing, and more specifically to channel estimation using a score-based generative network.

BACKGROUND OF THE INVENTION

Processing multichannel wireless data is complicated by the presence of signal path variations due to obstacles and other signal interference sources.

SUMMARY OF THE INVENTION

A system for processing data is disclosed that includes a scoring system operating on a processor that is configured to receive a channel sample and a noise sample and to generate a channel estimate. A sampling system operating on the processor is configured to receive a pilot channel sample and the channel estimate and to iteratively modify the channel estimate until a predetermined error rate is achieved.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings may be to scale, but emphasis is placed upon clearly illustrating the principles of the present disclosure. Moreover, in the drawings, like reference numerals designate corresponding parts throughout the several views, and in which:

FIG. 1 is a diagram of a training step system, in accordance with an example embodiment of the present disclosure;

FIG. 2 is a diagram of a testing system, in accordance with an example embodiment of the present disclosure;

FIG. 3 is a diagram of a system for processing channel signals, in accordance with an example embodiment of the present disclosure;

FIG. 4 is a diagram of an algorithm for processing channel samples in batch mode, in accordance with an example embodiment of the present disclosure;

FIG. 5 is a diagram of an algorithm for testing a current estimate of a channel, in accordance with an example embodiment of the present disclosure;

DETAILED DESCRIPTION OF THE INVENTION

Figure 6:
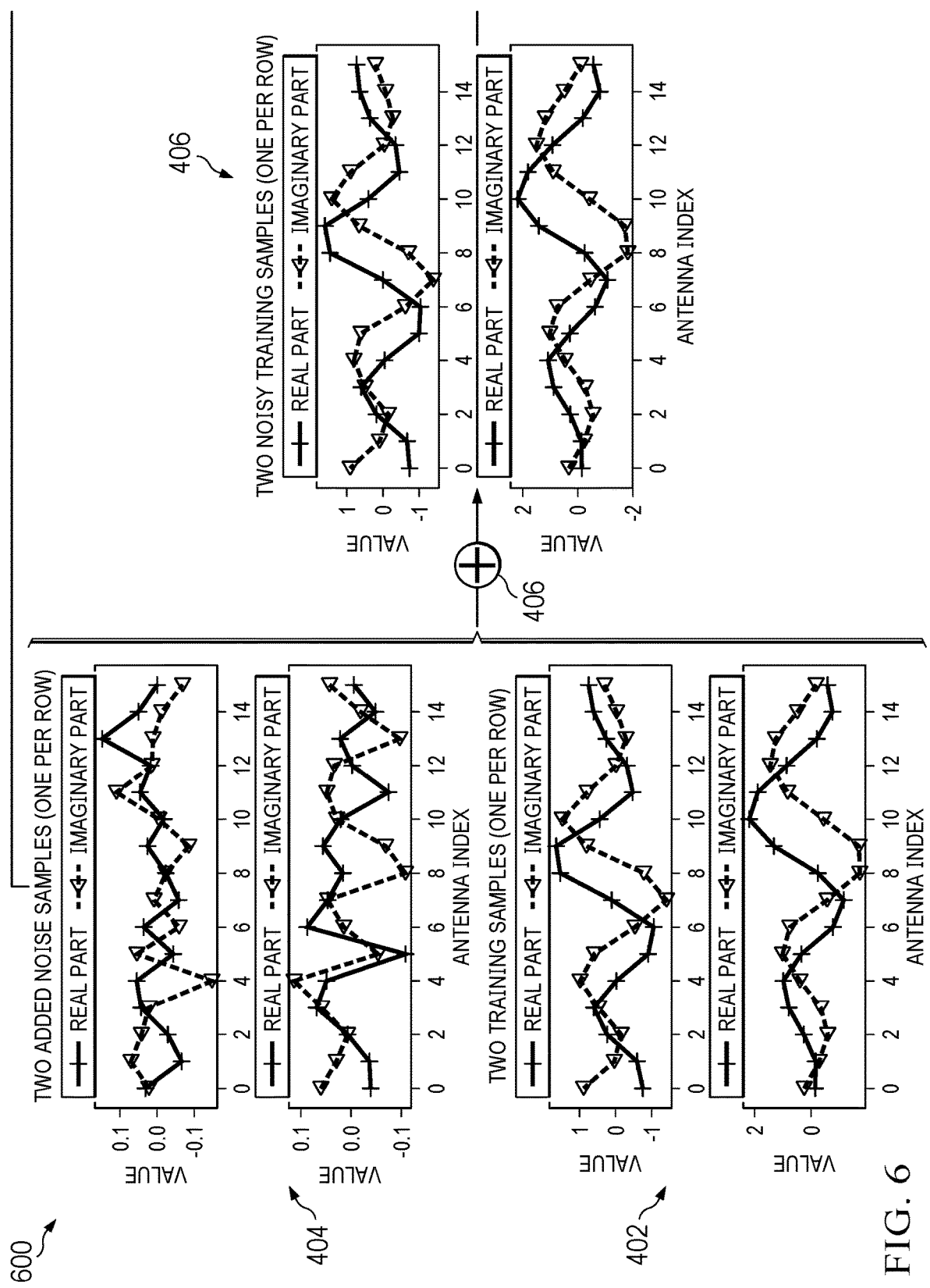
FIG. 6 is a diagram of example data samples associated with an algorithm for processing channel samples in batch mode, in accordance with an example embodiment of the present disclosure.
Figure 6:

In the description that follows, like parts are marked throughout the specification and drawings with the same reference numerals. The drawing figures may be to scale and certain components can be shown in generalized or schematic form and identified by commercial designations in the interest of clarity and conciseness.

The present disclosure relates to systems and methods for training a score-based generative model on a database of channel realizations and using the score-based generative model in conjunction with pilot signals. The model can be used during deployment to perform high-dimensional channel estimation in digital communication scenarios, and for other suitable purposes.

The specific application of score-based generative models for channel estimation is novel. The training of a score-based generative model using a database of channel sample signals in order to estimate the score of the distribution of channels in a given environment is also novel. The application of these novel processes to combine pilot signals with a pre-trained score-based generative model for real-time operation (which is referred herein as "inference") during deployment in communication systems is therefore also novel, and can include a hyper-parameter tuning method or other suitable processes that are not obvious. In one embodiment, hyper-parameter tuning can be accomplished using a database of channel samples different than the training database, which is referred to herein as a validation database, or in other suitable manners. Analysis of the applicability of these novel innovations to new and changing propagation environments is also novel. The disclosed systems and method can be used at one or more receiver in a wireless communications system, including receivers at each station that is capable of receiving and transmitting data.

The present disclosure solves the problem of power and pilot-efficient channel estimation in high-dimensional digital communication systems. The disclosure provides significant performance gains, regardless of the environment it is used in. The performance gains can be quantified either in power savings, increased data rates in communication systems or in other suitable manners.

The systems and methods of the present disclosure are flexible and can be used across any suitable high-dimensional channel. In one example embodiment, the systems and methods can be used with 1) spatially-multiplexed signals such as multiple-input, multiple-output (MIMO) systems, 5G systems, 6G systems, WiFi systems and so forth, 2) time or frequency domain multiplexed signals, including LTE systems, 5G systems, 6G systems, WiFi systems and so forth, other suitable systems or a suitable combination of systems.

Embodiments of the present disclosure can use large computational complexity where suitable, which may require faster processing speed for use in 5G or WiFi systems. Software engineering can provide an expected gain, as well as algorithmic improvements, with compounding gains. In one example embodiment, the present disclosure can be used in a deployed device in the training phase, where the machine learning model could be updated using streaming data, instead of using a database.

Channel estimation is a critical task for wireless transceivers. Given the large number of antennas in MIMO, 5G and upcoming 6G technologies, achieving power and resource efficiency requires carefully designed algorithms, and is a goal of the present disclosure for communication platforms. Current data-driven methods suffer from severe performance drops when operating in new environments, whereas classical algorithms do not scale to high-dimensional real world channels. The present disclosure mitigates these problems and enables safe and efficient operation in all channel environments.

The present disclosure provides systems and methods for training a score-based generative model and that can be iteratively used during inference to perform channel estimation. Score-based generative models are a novel and extremely powerful tool for modeling complex distributions of real-world signals "in the wild." The present disclosure uses the expressive power of these models to learn the distribution of channels in a training environment, and to further use these models for channel estimation in any target environment, with high efficiency and zero extra overhead or adaptation required.

The systems and methods of the present disclosure can be implemented and replicated in a suitable software library for deep learning, and can be deployed on processors, including special-purpose processors with associated hardware configurations (such as a graphics processing unit (GPU), a tensor processing unit (TPU), an application-specific integrate system (ASIC) or other suitable platforms).

The systems and methods of the present disclosure allow high-performance channel estimation, leading to up to double the energy efficiency in terms of pilot signal processing overhead. The present disclosure can increase estimation quality by up to 10 dB given a fixed pilot overhead, compared to prior art methods. The present disclosure can be used with wireless modems (both hardware and software), such as in the context of 5G and 6G energy efficiency and the integration of artificial intelligence algorithms in future cellular standards.

The disclosed systems and methods combine score-based generative models with channel estimation. During a training phase, a database of suitable channel data, such as simulated channels that have been acquired offline, can be used to train a deep neural network, to predict the score of the distribution of channels in the target environment. The channel data could be known, could include noisy and under-sampled channel data or could include other suitable data. In one example embodiment, the training database can include simulated channels, acquired channel measurements, other suitable data or a suitable combination of data. The following expression for the target score function or other suitable expressions can be used:

4

$$\nabla_H, \log p(H' \mid H) = \frac{H - H'}{\sigma^2} = \frac{H - (H + z)}{\sigma^2} = -\frac{z}{\sigma^2},$$

$$z \sim N(0, \sigma^2 I), \forall \sigma > 0$$

where H is the channel state information matrix, z is the perturbation, $\sigma^2$ is the statistical variance of the perturbation z and N(0, $\sigma^2$I), is the multivariate Gaussian distribution of the perturbation z.

After the training phase, a deployment or inference phase is used to iteratively refine the channel estimate in conjunction with a learned score-based generative model and the received pilot channels. The disclosed inference phase systems and methods utilize Bayesian statistics and are provably optimal even in environments that differ from training. The following algorithm or other suitable algorithms can be used for channel estimation via posterior sampling:

$$H_{t+1} \leftarrow H_t + \alpha_t P^H(Y - PH_t) + \beta_t f(H_t; \theta) + \eta_t z_t$$

where $\alpha_t P^H(Y - PH_t)$ represents an increase in the likelihood of the present pilot and $\beta_t f(H_t; \theta)$ represents a perturbation to the process. The three terms are modified by step sizes $\alpha_t$, $\beta_t$ and $\eta_t$, which are tunable hyper-parameters that can be implemented as decaying step sizes or in other suitable manners.

To select the initial step sizes $\alpha_t$, $\beta_t$ and $\eta_t$ at t=0, their decay rates, and the number of total steps T, a database of channels that is different from the training database is used, and the best initial step sizes are chosen that minimize a target error metric. This database can be referred to as a validation database and can be much smaller than the training database. In one embodiment, the minimized target error is the mean squared error between estimated channels at the T-th step and the true validation channels, and a grid search or other suitable searches can be performed to find the best hyper-parameters. Additional information pertaining to the proofs of these and associated algorithms can be obtained from Arvinte, Marius, and Jonathan I. Tamir, "MIMO Channel Estimation using Score-Based Generative Models," arXiv preprint arXiv:2204.07122 (2022) and Arvinte, Marius, and Jonathan I. Tamir, "Score-Based Generative Models for Robust Channel Estimation," 2022 IEEE Wireless Communications and Networking Conference (WCNC), IEEE, 2022, each of which is hereby incorporated by reference for all purposes as if set forth herein in its entirety.

FIG. 1 is a diagram of a training step system 100, in accordance with an example embodiment of the present disclosure. Training step system 100 includes channel sample system 102, random noise sample system 104, adder 106, estimate score system 108 and estimated score processing 110, each of which can be implemented in hardware or a suitable combination of hardware and software.

Channel sample system 102 can be implemented as one or more algorithms that are stored in memory and that cause a processor to generate channel samples. In one example embodiment, channel sample system 102 can select channel samples, such as from a pre-acquired database, but channel sample system 102 can also or alternatively acquire channel samples, including through an external mechanism, or can otherwise obtain channel samples for processing for a predetermined application or environment.

Random noise sample system 104 can be implemented as one or more algorithms that are stored in memory and that cause a processor to generate random noise. In one example embodiment, the noise is different for each sample generated by channel sample system 102, such as if the same sample gets selected twice in a row (including from a random selection with replacement from the training set), the second set of random noise applied to the second selection of the sample will be different from the first set of random noise applied to the first selection of that sample.

Adder 106 can be implemented as one or more algorithms that are stored in memory and that cause a processor to add the randomly generated noise to the randomly selected or acquired sample, to further feed to the score-based generative model and compute the target score function. In one example embodiment, the perturbed sample can be used both as input to the network, as well as to generate the target score function. Other suitable systems and processes can also or alternatively be used to inject the effect of noise on the sample signal. For example, other noise injection strategies than adding can be used to inject the effect of noise on the sample signal and determine the target score function.

Estimate score system 108 can be implemented as one or more algorithms that are stored in memory and that cause a processor to process the sampled channel and random noise to generate an estimated score. In one example embodiment, the systems and methods disclosed herein for providing a deep score based generative model can be used, or other suitable systems and methods can also or alternatively be used.

Estimate score processing 110 can be implemented as one or more algorithms that are stored in memory and that cause a processor to process the current estimated score and a score function with loss and back propagate parameters. In one example embodiment, the systems and methods disclosed herein for providing a deep score based generative model can be used, or other suitable systems and methods can also or alternatively be used.

In operation, system 100 can be used to train a score-based generative model on a database of channel realizations for use in subsequent pilot transmission processing or for other suitable purposes.

FIG. 2 is a diagram of a testing system 200, in accordance with an example embodiment of the present disclosure. Testing system 200 includes current estimate system 202, deep score generative model 204, random sample noise system 206, weighted adder 208, channel sample system 210, conditional score system 212, validation system 214 and hyper-parameter tuning 216 each of which can be implemented in hardware or a suitable combination of hardware and software.

Current estimate system 202 can be implemented as one or more algorithms that are stored in memory and that cause a processor to iteratively generate an estimated pilot channel signal in response to an updated estimate of a score for a transmission channel loss. In one example embodiment, the systems and methods disclosed herein for providing a deep score based generative model can be used, or other suitable systems and methods can also or alternatively be used.

Deep score based generative model 204 can be implemented as one or more algorithms that are stored in memory and that cause a processor to receive a current estimate of a transmission channel loss model and to generate an estimated score. In one example embodiment, the systems and methods disclosed herein for providing a deep score based generative model can be used, such as with hyper-parameter weights $\alpha_t$, $\beta_t$ and $\eta_t$, or other suitable systems and methods can also or alternatively be used.

Random sample noise 206 can be implemented as one or more algorithms that are stored in memory and that cause a processor to generate a random noise sample for use in processing an iteration of the channel loss estimation. In one example embodiment, the systems and methods disclosed herein for providing a deep score based generative model can be used, or other suitable systems and methods can also or alternatively be used.

Weighted adder 208 can be implemented as one or more algorithms that are stored in memory and that cause a processor to implement hyper-parameter tuning, such as to apply a different weight to each of the three terms of the channel loss model that enter weighted adder 208, each with a suitable associated decay schedule. Weighted adder 208 then adds the three terms to generate the current estimate of the pilot channel. In one example embodiment, the systems and methods disclosed herein for providing a deep score based generative model with hyper-parameter tuning can be used, such as in conjunction with $\alpha_t$, $\beta_t$ and $\eta_t$, or other suitable systems and methods can also or alternatively be used.

Channel sample system 210 can be implemented as one or more algorithms that are stored in memory and that cause a processor to produce a pilot Y at its output. The pilot can be a known signal received from a predetermined source as discussed herein or in other suitable manners. In one example embodiment, the systems and methods disclosed herein for providing a deep score based generative model can be used, or other suitable systems and methods can also or alternatively be used.

Conditional score system 212 can be implemented as one or more algorithms that are stored in memory and that cause a processor to receive the current estimate from current estimate 202 and "Y" from channel sample 210 and to output a conditional score of the conditional distribution of Y given H. In one example embodiment, the output of deep score based generative model 204 is the "score function", whereas the output of conditional score 212 is called "conditional score function." The systems and methods disclosed herein for providing a deep score based generative model can be used, or other suitable systems and methods can also or alternatively be used.

Validation system 214 can be implemented as one or more algorithms that are stored in memory and that cause a processor to compare an estimated channel at each iteration with a known validation channel and to output an error metric between the two. In one example embodiment, the mean squared error between the two channel matrices is evaluated. The systems and methods disclosed herein for providing a deep score based generative model can be used, or other suitable systems and methods can also or alternatively be used.

Hyper-parameter tuning system 216 can be implemented as one or more algorithms that are stored in memory and that cause a processor to take as input the output of validation system 214 and to determine how and which hyper-parameters to tune. The output of hyper-parameter tuning system 216 can include hyper-parameters such as $\alpha_t$, $\beta_t$ and $\eta_t$, which can be provided directly to weighted adder 208. In one example embodiment, the hyper-parameters are searched in a predetermined set, and the best ones are retained, similar to a streaming minimum operation that searches for the best hyper-parameters. If a new calculated error is lower, the current hyper-parameters can be stored as the best, and the search can be terminated or can continue. Other suitable optimization techniques as opposed to a simple grid search can also or alternatively be used to tune the hyper-parameters. The systems and methods disclosed herein for providing a deep score based generative model can be used, or other suitable systems and methods can also or alternatively be used.

In operation, system 200 is used to receive a pilot channel sample and a channel estimate and to iteratively modify the channel estimate until a predetermined error rate is achieved that can be used to validate the channel loss model.

FIG. 3 is a diagram of a system 300 for processing channel signals, in accordance with an example embodiment of the present disclosure. System 300 includes error correction encoding 302, modulation system 304, precoding and beam forming 306, symbol equalization 308, soft bit estimation 310, soft LDPC decode 312 and channel estimation 314, each of which can be implemented in hardware or a suitable combination of hardware and software.

Error correction encoding 302 can be implemented as one or more algorithms that are stored in memory and that cause a processor to perform error correction encoding on a voice or data channel. In one example embodiment, low density parity check (LDPC) coding, polar linear block error correcting code, turbo forward error correcting coding, or other suitable channel coding can be used, such as one that can be used with MIMO, 5G, 6G or other wireless data transmission protocols.

Modulation system 304 can be implemented as one or more algorithms that are stored in memory and that cause a processor to modulate the channel using a suitable data modulation protocol. The present disclosure can be used with a suitable modulation protocol, such as MIMO, 5G, 6G or others as discussed herein.

Precoding and beam forming 306 can be implemented as one or more algorithms that are stored in memory and that cause a processor to perform precoding and beam forming on the modulated data, consistent with MIMO, 5G, 6G and other suitable modulation protocols.

Symbol equalization 308 can be implemented as one or more algorithms that are stored in memory and that cause a processor to perform symbol equalization on a received data signal. The present disclosure can be used with any suitable symbol equalization protocol, including existing or future proprietary solutions for symbol equalization.

Soft bit estimation 310 can be implemented as one or more algorithms that are stored in memory and that cause a processor to perform soft bit estimation processing on the received data signal. The present disclosure can be used with any suitable soft bit estimation protocol, including existing or future proprietary solutions for soft bit estimation.

Soft decode 312 can be implemented as one or more algorithms that are stored in memory and that cause a processor to perform error correction decoding on a voice or data channel. The decoding protocol will correlate to the encoding protocol, such as LDPC decoding, polar decoding, turbo decoding, or other suitable decoding.

Channel estimation 314 can be implemented as one or more algorithms that are stored in memory and that cause a processor to generate a channel loss model estimate for use by soft bit estimation 310 and soft decode 312. In one example embodiment, channel estimation can receive pilot channel Y from channel sample system 210. Channel estimation 314 can be updated to improve data processing accuracy, in accordance with the systems and processes disclosed herein.

In operation, system 300 allows data transmission to be optimized by reducing the time and power needed to determine the proper compensation for transmission channel interference. System 300 thus results in improved data communications.

FIG. 4 is a diagram of an algorithm 400 for processing channel samples in batch mode, in accordance with an example embodiment of the present disclosure. Algorithm 400 can be implemented in hardware or a suitable combination of hardware and software.

Algorithm 400 begins at 402, where a channel sample system generates a sample batch of channels. In one example embodiment, the sampling can be performed with replacement, but sampling without replacement or in other suitable manners can also be used. The algorithm then proceeds to 404.

At 404, a random noise sample system generates random noise for each of the samples in the batch produced at 402. In one example embodiment, a different noise set can be generated for each sample, or other suitable processes can also or alternatively be used. The algorithm then proceeds to 406.

At 406, the generated noise sets are added to each sample in the batch. In one example embodiment, each of the noise sets produced at 404 can be added to the samples produced at 402 in parallel, or in other suitable manners. The algorithm then proceeds to 408.

At 408, a deep score based generative model is used to process the sampled channel and random noise to generate a current estimate. In one example embodiment, the deep score based generative model performs batch processing of the sampled channels with added random noise sets, to generate a batch of score function estimates. Processing for each sample can happen in parallel or in other suitable manners. The algorithm then proceeds to 410.

At 410, each of the estimated score functions produced by 408 is compared to the true score functions, which are known analytically, and their (squared) difference is computed to determine the weighted average loss for each corresponding sample in the batch. A weighted average of the per-sample losses can be generated by aggregating the loss for all samples in the batch to obtain the final training loss or in other suitable manners.

In operation, algorithm 400 processes samples in batch mode. Although algorithm 400 is shown as a flow chart, a person of skill in the art will recognize that it can also or alternatively be implemented using object oriented programming, state diagrams, ladder diagrams, other suitable programming paradigms or a suitable combination of programming techniques. Likewise, algorithm 400 can also or alternatively be used for real-time processing where suitable.

FIG. 5 is a diagram of an algorithm 500 for testing a current estimate of a channel, in accordance with an example embodiment of the present disclosure. Algorithm 500 can be implemented in hardware or a suitable combination of hardware and software.

Algorithm 500 beings at 502, where a current estimate of a channel is applied to a deep score based generative model to obtain an estimated score function. The algorithm then proceeds to 504.

At 504, a conditional score function is obtained from the current estimate and the current pilot channel Y, such as may be generated using channel sample system 210 or in other suitable manners. The algorithm then proceeds to 506.

At 506, a weighted estimate of the score function and the weighted conditional score function is applied to the current estimate of the channel. In one example embodiment, the processes discussed herein can be used or other suitable processes can also or alternatively be used. The outputs generated at 504 and 506 are then both provided as input to 508.

At 508, the results are added with weighted sampled random noise. In one example embodiment, the processes discussed herein can be used or other suitable processes can also or alternatively be used. The algorithm then proceeds to 510.

At 510, a new estimate of the channel is estimated. In one example embodiment, the processes discussed herein can be used or other suitable processes can also or alternatively be used. The algorithm then proceeds to 512.

At 512, it is determined whether the algorithm should terminate. In one example embodiment, the algorithm may terminate if the maximum number of updates is reached or if other suitable conditions are met, and then proceeds to 514. Otherwise, the algorithm returns to 502.

At 514, the final channel estimate is generated. In operation, algorithm 500 processing samples in batch mode. Although algorithm 500 is shown as a flow chart, a person of skill in the art will recognize that it can also or alternatively be implemented using object oriented programming, state diagrams, ladder diagrams, other suitable programming paradigms or a suitable combination of programming techniques.

FIG. 6 is a diagram 600 of example data samples associated with an algorithm for processing channel samples in batch mode, in accordance with an example embodiment of the present disclosure. Diagram 600 includes a sample batch of channels 402, added sample noise 404, the results 406 of the addition of the sample batch of channels 402 and the added sample noise 404, and the weighted average loss. Each set of data includes values for an array of receive antennae and a single transmit antenna and shows real and imaginary data values for each set. As can be seen, the noise signal modifies the training samples and results in different estimated scores for each antenna. It can also be seen that the negative estimated scores 408 resemble the added noise 404, but not are perfectly identical. Minimizing these differences is the objective of the training loss 410. This loss is applied as a complex-valued loss and involves both the real and imaginary parts of the estimated scores 408 and the ground truth scores 404. In one example embodiment, a weighted mean squared error loss is used for training, where the weight is proportional to the statistical variance of the added noise 404.

Figure 7:
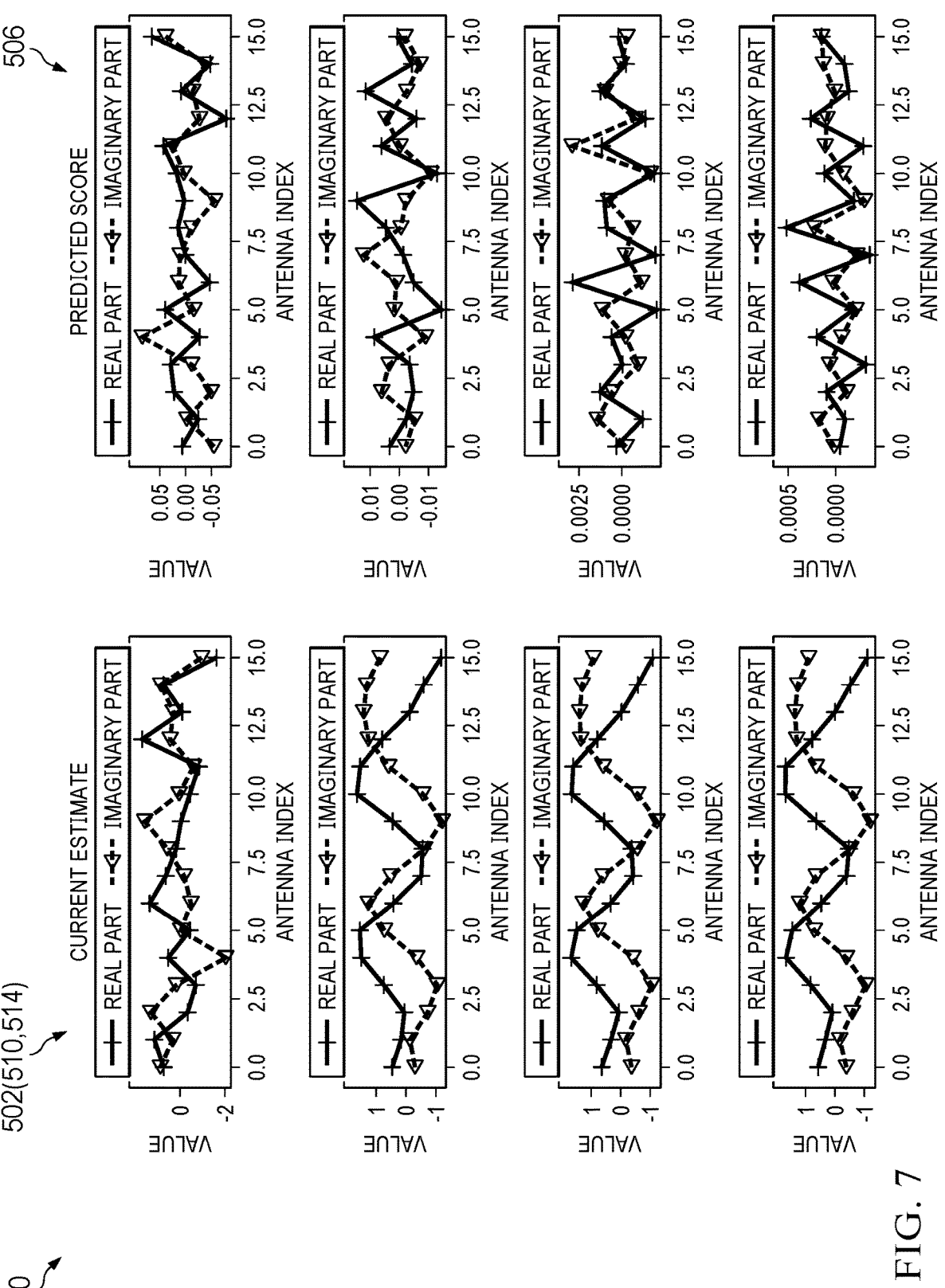
FIG. 7 is a diagram of example data samples associated with an algorithm for testing a current estimate of a channel, in accordance with an example embodiment of the present disclosure.
Figure 7:
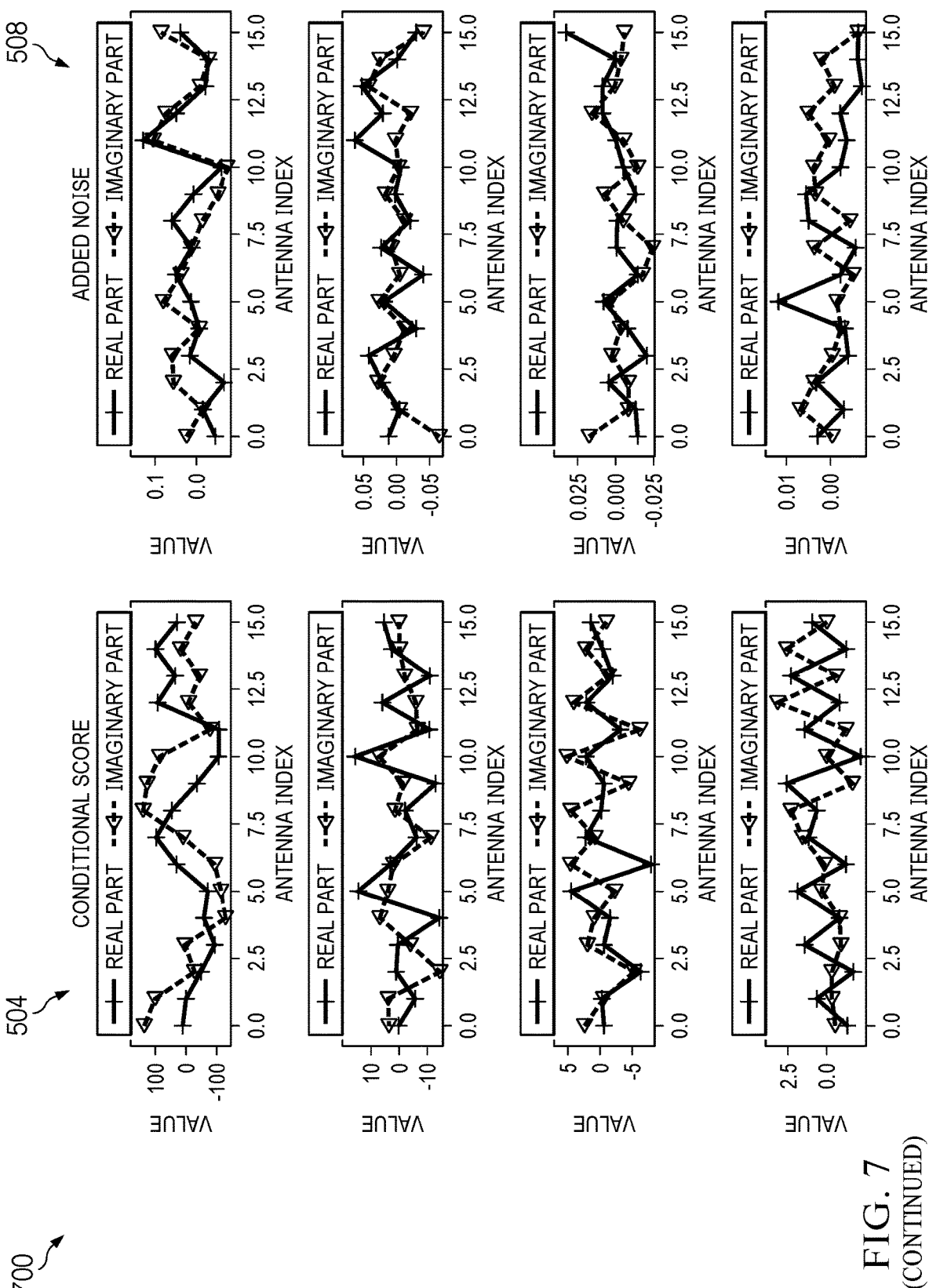
Figure 7:
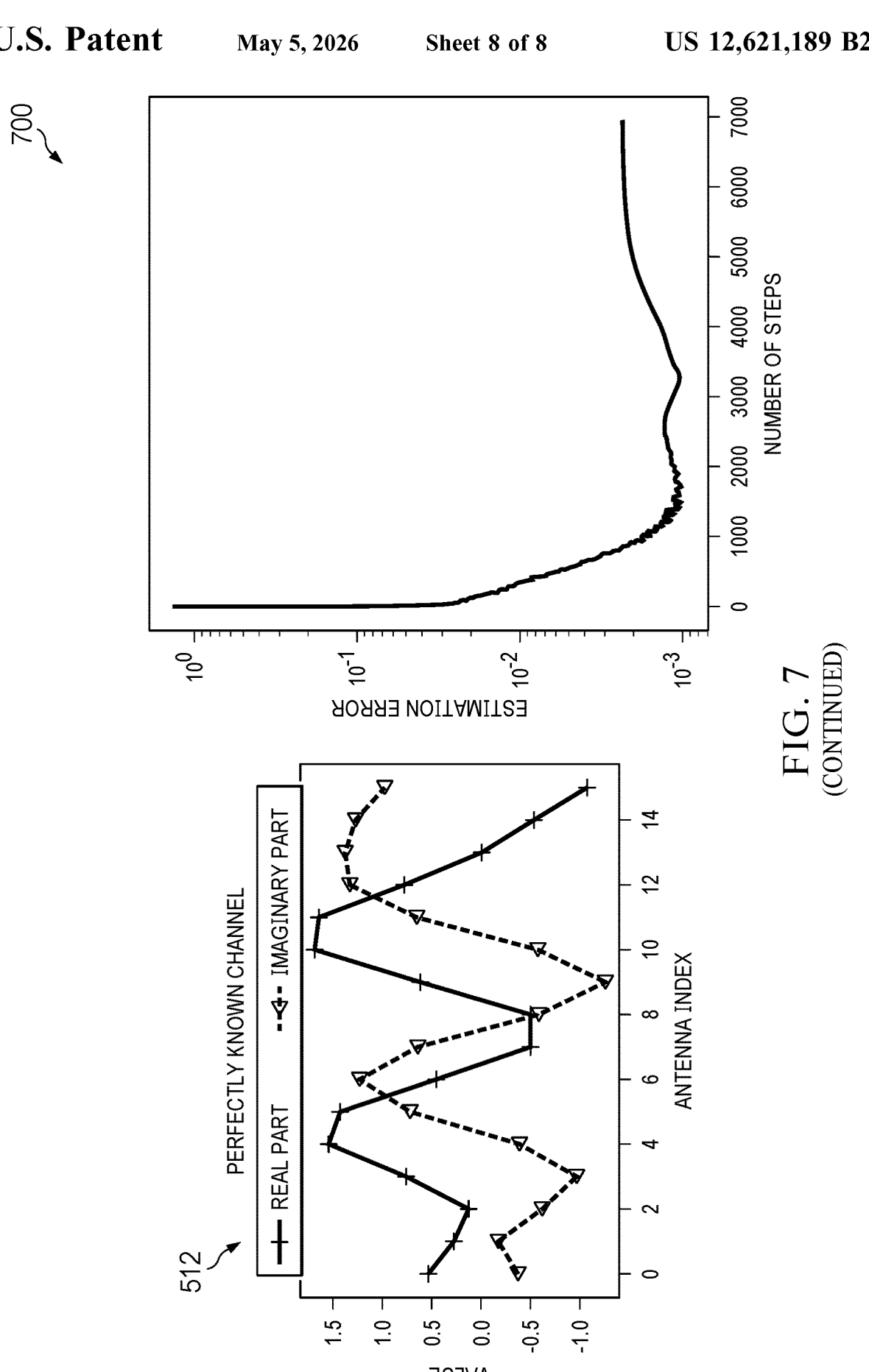

FIG. 7 is a diagram 700 of four example data samples associated with an algorithm for testing a current estimate of a channel, in accordance with an example embodiment of the present disclosure, where each row represents a separate, randomly chosen sample from a training database. Diagram 700 includes channel estimate data sets 502, 510 and 514, conditional score function data sets 504, estimated score data sets 506, added noise data sets 508, all captured with a specific set of hyper-parameters. FIG. 512 shows the ground truth for a single sample (corresponding to the first row). The right side of Diagram 700 contains an estimation error plot between a single channel estimate 502 (first row in left side) and its corresponding ground truth 512 as a function of the number of estimation steps hyper-parameter. In one example embodiment, the optimal number of steps is chosen such that this error is minimized.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more micro-computers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. The term "data" can refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or software components for the electronic processing of data.

In general, a software system is a system that operates on a processor to perform predetermined functions in response to predetermined data fields. A software system is typically created as an algorithmic source code by a human programmer, and the source code algorithm is then compiled into a machine language algorithm with the source code algorithm functions, and linked to the specific input/output devices, dynamic link libraries and other specific hardware and software components of a processor, which converts the processor from a general purpose processor into a specific purpose processor. This well-known process for implementing an algorithm using a processor should require no explanation for one of even rudimentary skill in the art. For example, a system can be defined by the function it performs and the data fields that it performs the function on. As used herein, a NAME system, where NAME is typically the name of the general function that is performed by the system, refers to a software system that is configured to operate on a processor and to perform the disclosed function on the disclosed data fields. A system can receive one or more data inputs, such as data fields, user-entered data, control data in response to a user prompt or other suitable data, and can determine an action to take based on an algorithm, such as to proceed to a next algorithmic step if data is received, to repeat a prompt if data is not received, to perform a mathematical operation on two data fields, to sort or display data fields or to perform other suitable well-known algorithmic functions. Unless a specific algorithm is disclosed, then any suitable algorithm that would be known to one of skill in the art for performing the function using the associated data fields is contemplated as falling within the scope of the disclosure. For example, a message system that generates a message that includes a sender address field, a recipient address field and a message field would encompass software operating on a processor that can obtain the sender address field, recipient address field and message field from a suitable system or device of the processor, such as a buffer device or buffer system, can assemble the sender address field, recipient address field and message field into a suitable electronic message format (such as an electronic mail message, a TCP/IP message or any other suitable message format that has a sender address field, a recipient address field and message field), and can transmit the electronic message using electronic messaging systems and devices of the processor over a communications medium, such as a network. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, where the data fields and associated functions can be set forth in an exemplary order of operations, where the order can be rearranged as suitable and is not intended to be limiting unless explicitly stated to be limiting.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A system for processing data, comprising:
a scoring system operating on a processor and configured to receive a channel sample and a noise sample and to generate a channel estimate; and
a sampling system operating on the processor and configured to receive a pilot channel sample and the channel estimate and to iteratively modify the channel estimate until a predetermined error rate is achieved;
wherein the scoring system comprises a channel sample system configured to select a predetermined channel sample for use in generation of the channel estimate.

2. The system of claim 1 wherein the sampling system further comprises a generative model system configured to apply a plurality of tunable parameters to the channel estimate.

3. The system of claim 1 wherein the sampling system further comprises a hyper-parameter tuning system configured to implement hyper-parameter tuning to modify the channel estimate.

4. The system of claim 1 wherein the sampling system further comprises a validation system configured to implement hyper-parameter tuning to modify the channel estimate until a predetermined error threshold is obtained.

5. The system of claim 1 wherein the scoring system comprises a random noise sample system configured to generate a random noise sample for each channel sample.

6. The system of claim 1 wherein the scoring system comprises a deep score based generative model system configured to process a sum of the channel sample and the noise sample to generate the channel estimate.

7. The system of claim 1 wherein the sampling system comprises a random noise sample system configured to generate a random noise sample for each channel sample.

8. A method for processing data, comprising:
receiving a wireless data channel sample at a data processor;
receiving a noise sample at the data processor;
selecting a predetermined channel sample for use in generation of a channel estimate;
generating the channel estimate with the data processor by using the wireless data channel sample and the noise sample;
receiving a pilot channel sample;
processing the pilot channel sample using the channel estimate; and
iteratively modifying the channel estimate until a predetermined error rate of the processed pilot channel sample is achieved.

9. The method of claim 8 further comprising applying a plurality of tunable parameters to the channel estimate.

10. The method of claim 8 further comprising implementing hyper-parameter tuning to modify the channel estimate.

11. The method of claim 8 further comprising implementing hyper-parameter tuning to modify the channel estimate until a predetermined error threshold is obtained.

12. The method of claim 8 further comprising generating a random noise sample for each channel sample.

13. The method of claim 8 further comprising processing a sum of the channel sample and the noise sample to generate the channel estimate.

14. The method of claim 8 further comprising generating a random noise sample for each channel sample.

15. A computer program product for processing data, comprising at least one non-transitory computer readable medium including one or more instructions that, when executed by at least one processor, cause the at least one processor to:
receive a wireless data channel sample at a data processor;
receive a noise sample at the data processor;
generate a channel estimate with the data processor by using the wireless data channel sample and the noise sample;
receive a pilot channel sample;
process the pilot channel sample using the channel estimate; and
iteratively modify the channel estimate until a predetermined error rate of the processed pilot channel sample is achieved.

16. The computer program product according to claim 15, wherein the one or more instructions, when executed by the at least one processor, further cause the at least one processor to apply a plurality of tunable parameters to the channel estimate.

17. The computer program product according to claim 15, wherein the one or more instructions, when executed by the at least one processor, further cause the at least one processor to apply implement hyper-parameter tuning to modify the channel estimate.

18. The computer program product according to claim 15, wherein the one or more instructions, when executed by the at least one processor, further cause the at least one processor to apply implement hyper-parameter tuning to modify the channel estimate until a predetermined error threshold is obtained.

19. The computer program product according to claim 15 wherein the wireless data channel sample and the noise sample are received in separate steps.

20. The computer program product according to claim 15 wherein the wireless data channel sample is transmitted to a conditional score system.

\* \* \* \* \*